United States Patent [19]
Muramatsu

[11] Patent Number: 6,044,945
[45] Date of Patent: *Apr. 4, 2000

[54] ONEWAY CLUTCH AND OUTER RACE-RETAINER ASSEMBLY FOR A ONEWAY CLUTCH

[75] Inventor: Kazuhiko Muramatsu, Fukuroi, Japan

[73] Assignee: NSK-Warner K.K., Tokyo, Japan

[ * ] Notice: This patent is subject to a terminal disclaimer.

[21] Appl. No.: 09/129,385

[22] Filed: Aug. 5, 1998

[30] Foreign Application Priority Data

Aug. 7, 1997  [JP]  Japan ................................. 9-224453

[51] Int. Cl.$^7$ ..................................................... F16D 3/34
[52] U.S. Cl. .............................................................. 192/45
[58] Field of Search ............................ 192/45; 188/82.84

[56] References Cited

U.S. PATENT DOCUMENTS

| | | | |
|---|---|---|---|
| 2,843,238 | 7/1958 | Rozner ........................................ | 192/45 |
| 3,184,020 | 5/1965 | Benson et al. ............................. | 192/45 |
| 4,422,537 | 12/1983 | Ritter et al. ................................ | 192/45 |
| 5,046,229 | 9/1991 | Lederman .............................. | 192/45 X |
| 5,279,399 | 1/1994 | Riggle ........................................ | 192/45 |
| 5,372,227 | 12/1994 | Kinoshita et al. ......................... | 192/45 |
| 5,603,394 | 2/1997 | Joppeck .................................... | 192/45 |
| 5,651,438 | 7/1997 | Papania ..................................... | 192/45 |
| 5,667,046 | 9/1997 | Stanton et al. ............................. | 192/45 |

FOREIGN PATENT DOCUMENTS

5-58976  8/1993  Japan .

Primary Examiner—Charles A Marmor
Assistant Examiner—Roger Pang
Attorney, Agent, or Firm—Vorys, Sater, Seymour and Pease LLP

[57] ABSTRACT

A one way clutch comprises an inner member, an outer race coaxial with the inner member, torque transmitting members provided between the inner member and the outer race to be displaced between a torque transmitting position and a non torque transmitting position, biasing members for biasing the corresponding torque transmitting members to the torque transmitting position until a predetermined torque is applied thereto, and a retainer for retaining the torque transmitting members and the biasing members. The retainer has an integral structure of plastic which comprises a first annular side member having a larger diameter than a basic circle of the outer race, a second annular side member having a diameter smaller than, but substantially equal to, that of the basic circle of the outer race so as to pass through the basic circle, a plurality of pole portions for connecting the first annular side member and the second annular side member in the axial direction, the pole portions together with the first and second annular side members, defining the apertures for mounting block bearings correspondingly to grooves of the outer race, and radially protruding portions are formed on the second annular side member correspondingly to the grooves of the outer race, the outer diameter of the radially protruding portions being smaller than that of the bottom of the grooves.

12 Claims, 7 Drawing Sheets

ONEWAY CLUTCH AND OUTER RACE-RETAINER ASSEMBLY FOR A ONEWAY CLUTCH

This application claims the benefit of Japanese Application No. 9-224453, which is hereby incorporated by reference.

BACKGROUND OF THE INVENTION

1. Field of the Invention

The present invention relates to a oneway clutch as well as an outer race-retainer assembly for a oneway clutch, suitably used for an automatic transmission, etc., of a car.

2. Related Background Art

A oneway clutch for an automatic transmission of a car has seen increasingly wide-spread use in automatic transmission vehicles.

In the conventional oneway clutch device of this kind, each of torque transmitting members disposed radially between an inner member and an outer race member which is concentric with the inner member can take a torque transmitting position at which the inner member and the outer race member are united integrally and a non torque transmitting position at which the inner member and the outer race member may be rotatable relatively to each other. Such torque transmitting members have been held by a retainer made of metal with biasing members. The retainer is fixed to the outer race member by two caulked side plates in the axial direction and through block bearings in a circumferential direction.

Thus, an outer race-retainer assembly is formed, and assembling of an inner member with the outer race-retainer assembly completes a oneway clutch.

More in detail, the metal retainer in the conventional structure is formed by first and second annular side members extended radially at both sides in the axial direction and pole portions connecting the first and second annular side members. In apertures defined by the first and second annular side members and the pole portions, the torque transmitting members and the biasing members for biasing the corresponding torque transmitting members to the torque transmitting positions are fitted or held, and also block bearings for positioning the retainer in the circumferential direction with respect to the outer race member are fitted or held, respectively. The positioning of the retainer in the circumferential direction with respect to the outer race member is effected by the first and second annular side members which sandwich the outer race member therebetween.

Since the metal retainer in the conventional oneway clutch has such a structure as described above, one of the first and second annular side members and the pole portions connecting therebetween can be made by punching an integral metal plate and properly bending it, but the remaining or other annular side member has to be prepared separately. After the former (that is, the unitary structure of the one of the first and second annular side members and the pole portions) is fitted into the outer race member, the block bearings are inserted from the axial direction into the unitary structure and the latter (that is, the other annular side member) is caulked to thereby pinch and fix the block bearings, thereby completing the retainer.

The metal retainer in the conventional oneway clutch device has a complicated structure as described above, and the method of manufacturing such retainer is also complicated, which results in a large number of manufacturing steps and a high manufacturing cost.

SUMMARY OF THE INVENTION

An object of the present invention is to provide a oneway clutch and an outer race-retainer assembly for a oneway clutch with an improved retainer such that the oneway clutch can be manufactured at a low cost.

According to the present invention, there is provided a oneway clutch which comprises an inner member, an outer race member coaxial with the inner member, torque transmitting members each provided between the inner member and the outer race member to be displaced between a torque transmitting position and a non torque transmitting position, biasing members each for biasing a corresponding torque transmitting member to the torque transmitting position until a predetermined torque is applied thereto, and a retainer for retaining the torque transmitting members and the biasing members, wherein grooves extended in the axial direction are formed at predetermined positions on the inner peripheral side of the outer race member, and respective block bearings are fitted in the grooves through apertures provided on the retainer correspondingly to the grooves in order to position the retainer in the circumferential direction. This oneway clutch is characterized in that the retainer is integrally made of plastic or synthetic resin and comprises a first annular side member having a larger diameter than a basic circle of the outer race, a second annular side member having a diameter smaller than, but substantially equal to, that of the basic circle of the outer race so as to pass through the basic circle, and a plurality of pole portions for connecting the first annular side member and the second annular side member in the axial direction, the pole portions, together with the first and second annular side members, define the apertures for mounting the block bearings correspondingly to the grooves of the outer race, and radially protruding portions are formed on the second annular side member correspondingly to the grooves of the outer race member, the outer diameter of the radially protruding portions being smaller than that of the bottoms of the grooves. Then, the oneway clutch is formed by the following steps. That is, after the torque transmitting members and the biasing members are assembled with the retainer, the retainer is inserted into the outer race member from the side of the second annular side member in such a manner that the radially protruding portions are passed through the grooves of the outer race member. Then, upon completion of the insertion, the retainer is rotated by a predetermined angle so that the radially protruding portions are placed to face a side of the outer race member. After that, the block bearings are fitted into the grooves of the outer race through the aperture from the inner peripheral side of the retainer.

Also, according to the present invention, there is provided an outer race-retainer assembly for a oneway clutch, the assembly comprising an outer race member to be provided coaxial with an inner member, torque transmitting members, each of which, when assembled into between the inner member and the outer race member, can take a non torque transmitting position for allowing a relative rotation between the inner member and the outer race member or a torque transmitting position for integrally rotating or stopping the inner member and the outer race member, biasing members for biasing the torque transmitting members to the torque transmitting position until a predetermined torque is applied thereto, a retainer for retaining the torque transmitting members and the biasing members, a block bearing for fixing the retainer to the outer race member, wherein a groove extended in an axial direction is provided at a predetermined position on the inner peripheral side of the outer race member, and the block bearing is fitted in the groove through an aperture formed on the retainer correspondingly to the groove. This assembly for a oneway clutch is characterized in that the retainer is integrally made of synthetic resin or plastic and comprises a first annular side member having a larger diameter than a basic circle of the outer race member, a second annular side member having a diameter smaller than, but substantially equal to, that of the basic circle of the outer race so as to pass through the basic circle, and a plurality of pole portions for connecting the first annular side member and the second annular side member in the axial direction, the pole portions, together with the first and second annular side members, define the aperture for mounting the block bearing correspondingly to the groove of the outer race, and a radially protruding portion is formed on the second annular side member correspondingly to the groove of the outer race member, the outer diametral dimension of the radially protruding portion being smaller than that of the bottom of the groove. Then, the outer race-retainer assembly for a oneway clutch is formed by the following steps. That is, after the torque transmitting members and the biasing members are assembled with the retainer, the retainer is inserted into the outer race member from the side of the second annular side member in such a manner that the radially protruding portion is passed through the groove of the outer race member, then, upon completion of the insertion, the retainer is rotated by a predetermined angle so as to dispose the radially protruding portion to face a side of the outer race member. After that, the block bearing is fitted into the groove of the outer race member through the aperture from the inner peripheral side of the retainer.

BRIEF DESCRIPTION OF THE DRAWINGS

FIGS. 4A–4C are views for schematically showing a retainer according to the above embodiment.

DESCRIPTION OF THE PREFERRED EMBODIMENTS

The attached drawings illustrate a oneway clutch according to an embodiment of the present invention, in which an outer race-retainer assembly 2 which is concentric with an inner member 1 is fittingly mounted on the circumference of the inner member 1 which serves as an inner race member. An outer peripheral surface of the inner member 1 serves as a circumferential raceway.

The outer race-retainer assembly 2 is comprised of an outer race 3, a retainer 4, cylindrical roller members 5 which are retained by the retainer 4 and serve as torque transmitting members, and biasing members 6 which are in contact with the respective cylindrical roller members 5 to press the cylindrical roller members 5 with pressure.

Figure 3A:
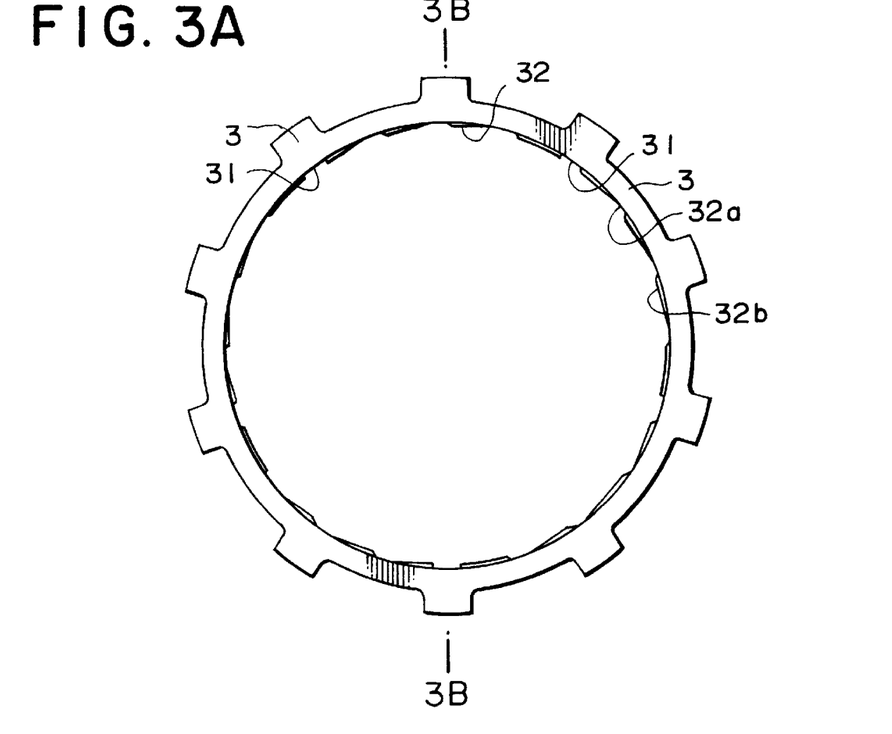
FIG. 3A is a front view schematically showing an outer race member according to the above embodiment.

The outer race 3 is formed by press working of a metal such as sintered alloy, and the inner peripheral surface of the outer race 3 is provided with grooves 31 which are extended in the axial direction along the basic circle thereof and separated from each other by a predetermined angle. The inner peripheral face of the outer race is also provided with a predetermined number of cam surfaces 32 between each two grooves. Each of the cam surfaces 32 is a smoothly inclined surface having a portion 32a which is largely separated from the outer peripheral surface of the inner member 1 and a portion 32b which is separated from the surface a little.

Figure 3B:
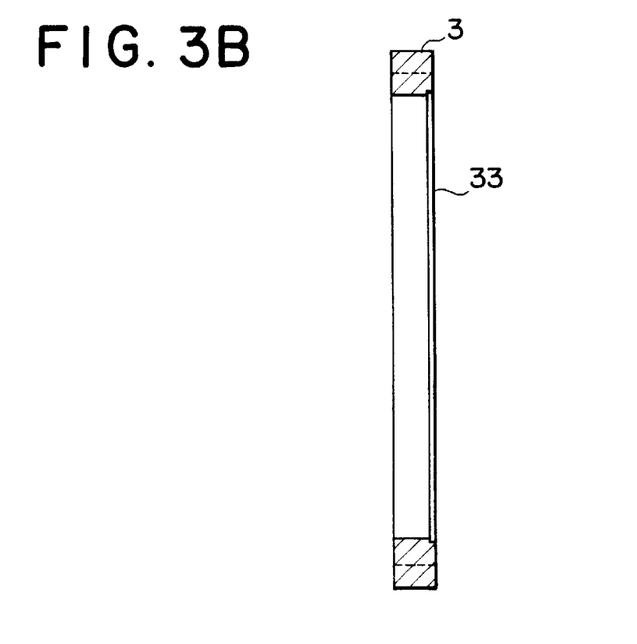
FIG. 3B is a cross-sectional view taken along 3B—3B in FIG. 3A.

As shown in FIG. 3B, an annular stepped portion 33 having a slightly larger diameter than that of the basic circle is formed on the an inner peripheral side surface of the outer race.

Figures 4A, 4B:
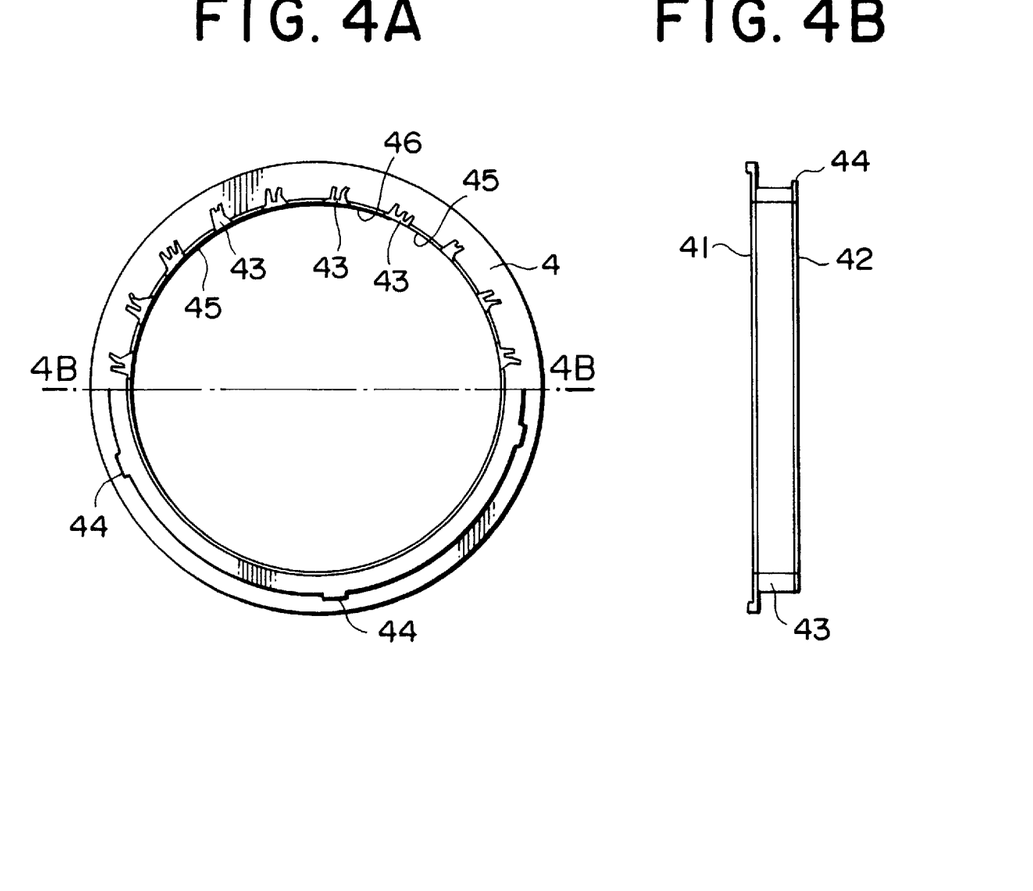
FIG. 4A is a front view of the retainer whose upper half is cut away.
FIG. 4B a cross-sectional view taken along 4B—4B in FIG. 4A, and FIG. 4C a partially enlarged view of the retainer.

The retainer 4 is formed of plastic and, as clearly shown in FIG. 4B, has an integral unitary structure which is comprised of a first annular side member 41 having a larger diameter, a second side member 42 having a smaller diameter, and a plurality of pole portions 43 for connecting the first annular side member 41 to the second annular side member 42 in the axial direction on the inner peripheral side.

The outer diameter of the first annular side member 41 of the retainer 4 is larger at least than the diameter of the basic circle of the outer race, which is sufficient to contact with a corresponding side face of the outer race 3 when the retainer 4 is assembled with the outer race 3, as described later.

The outer diameter of the second annular side member 42 of the retainer 4 is made smaller than the basic circle of the outer race 3 except for radially protruding portions 44. The radially protruding portions 44 are provided at the same angle with the axial grooves 31 of the outer race 3, which is described above. The outer diameter of the radially protruding portions 44 is made smaller than the diameter of the bottoms of the axial grooves 31.

Figure 4C:
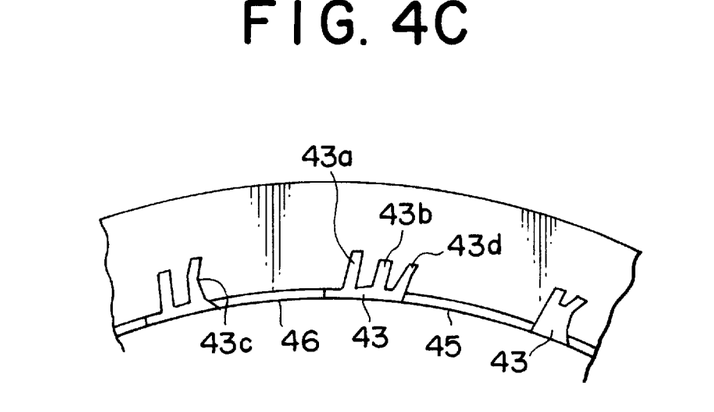

The pole portions 43 for connecting the first annular side member 41 to the second annular side member 42 of the retainer 4 define first apertures 45 at positions deviating from the radially protruding portions 44 by a predetermined angle at the same angular locations as those of the axial grooves 31 of the outer race 3. The width in the circumferential direction of each first aperture 45 is larger than the width in the circumferential direction of each groove 31 so that a block bearing 7 is inserted through the first aperture 45 from the inside of the retainer when the retainer 4 is assembled at a predetermined position inside the outer race 3, whereby the head 71 of each block bearing 7 is fitted in the groove 31 of the outer race so as to position the retainer 4 with respect to the outer race 3 in the circumferential direction.

Each block bearing 7 is made of, for example, sintered alloy, as disclosed in Japanese Utility Model Application No. 4-1403, and is provided with an aperture 72 in the axial direction thereof. Since the retainer 4 is made of plastic, the first aperture 45 is formed slightly smaller in the width in the circumferential direction than the width in the circumferential direction of the body 73 of the block bearing 7, whereby the block bearing 7 is squeezed in the aperture 45 by use of the elasticity of the plastic. One of the shoulder portions of the block bearing 7 is pressed with pressure against a protruding portion 43d of the retainer, as described later, so that the retainer 4 can be securely positioned with respect to the outer race 3 with no play or backlash.

In the present embodiment, the protruding portions 43d with the tip end inclined toward the inner side of the corresponding first aperture 45 is formed on one of the poles 43, 43 which define each first aperture 45 of the retainer 4 at the both sides thereof in the circumferential direction. Accordingly, each first aperture 45 is defined by the protruding portion 43d and the other pole 43. Thus, when the block bearing 7 is inserted in the first aperture 45 and the head 71 of the block bearing 7 is fitted in the groove 31 of the outer race to position the retainer, the tip end of the protruding portion 43d is brought into contact with pressure with a side portion 75 of the block bearing 7 to thereby urge the block bearing 7 against one of side walls of the groove 31 of the outer race. The retainer 4 is thus retained and held without play in the circumferential direction with respect to the outer race 3.

The pole portions 43 for connecting the first annular side member 41 to the second annular side member 42 of the retainer 4 also define second apertures 46 at positions each facing a corresponding cam surface 32 of the outer race when the retainer 4 is positioned inside the outer race 3. At least two radially protruding portions 43a, 43b for fixing a spring are formed at one side in the circumferential direction of the second aperture 46.

Accordingly, for the pole portions 43 between the first aperture 45 and the second aperture 46, each is formed with at least three radially protruding portions 43a, 43b and 43d. These three protruding portions 43a, 43b and 43d are inclined in the same direction, a leaf spring 6 is supported by the protruding portions 43a and 43b, as described later, and the shoulder portion of each block bearing 7 is urged by the protruding portion 43d so that the block bearing 7 is fixed with respect to the outer race.

Figure 2:
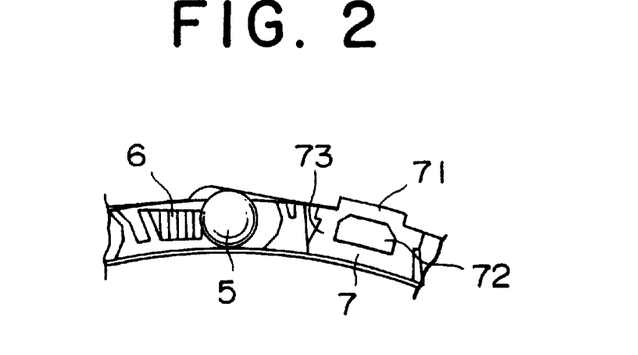
FIG. 2 is an enlarged view of a part of FIG. 1.

In each of the second apertures 46, a torque transmitting member 5 which is a cylindrical roller member in the present embodiment is installed, and the torque transmitting member 5 is biased toward the small diameter portion 32b side of the cam surface, by the leaf spring 6, as a biasing member, which is adjacent and contacted with the torque transmitting member 5 in the same second aperture 46.

Out of the poles 43 of the retainer 4, for portions for defining the second apertures 46 and facing the cylindrical torque transmitting members 5, each is formed with a recess 43c correspondingly to the cylindrical form of the torque transmitting member.

Also, an end portion of the leaf spring 6 contacted with the torque transmitting member 5 is also provided with a recess 61 correspondingly to the cylindrical form of the torque transmitting member 5. Since each of the torque transmitting members 6 is thus retained in an embracing manner from the both sides in the circumferential direction, the torque transmitting members 5 each can be retained with a smaller biasing force, so that a so-called drag of the torque transmitting member 5 can be reduced.

Figure 5:
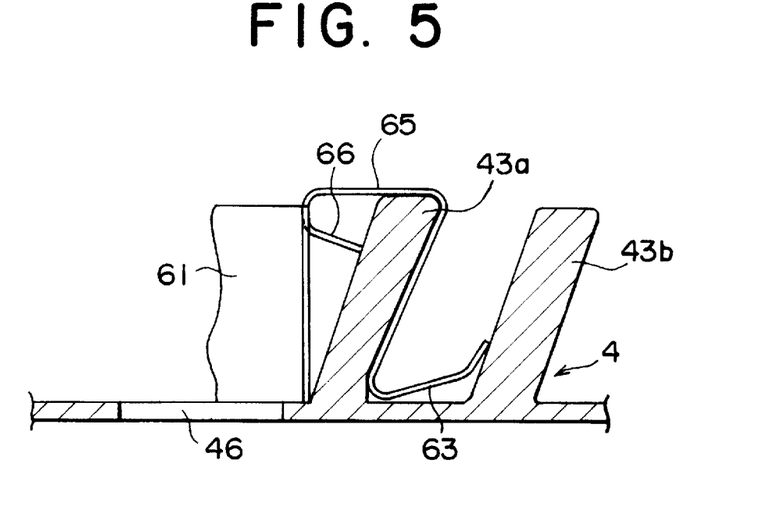
FIG. 5 is an explanatory view for showing a relationship between the retainer and a spring in the above embodiment.

The two protruding portions 43a and 43b for supporting the leaf spring 6, out of the poles 43 of the retainer 4, are inclined toward the outer diameter side from the inner diameter side, as shown in FIG. 5.

A base 62 of the leaf spring 6 is made in the form of a clip, and one of the protruding portions 43a is bent toward the inner diameter side as if it is wound around from the outer diameter side, as shown in FIG. 5, and is folded back outwardly at the base of the inner diameter so as to form a clip-shaped portion 63. This clip-shaped portion 63 presses and thrusts the other protruding portion 43b to be supported by the pole portion 43.

Figure 6:
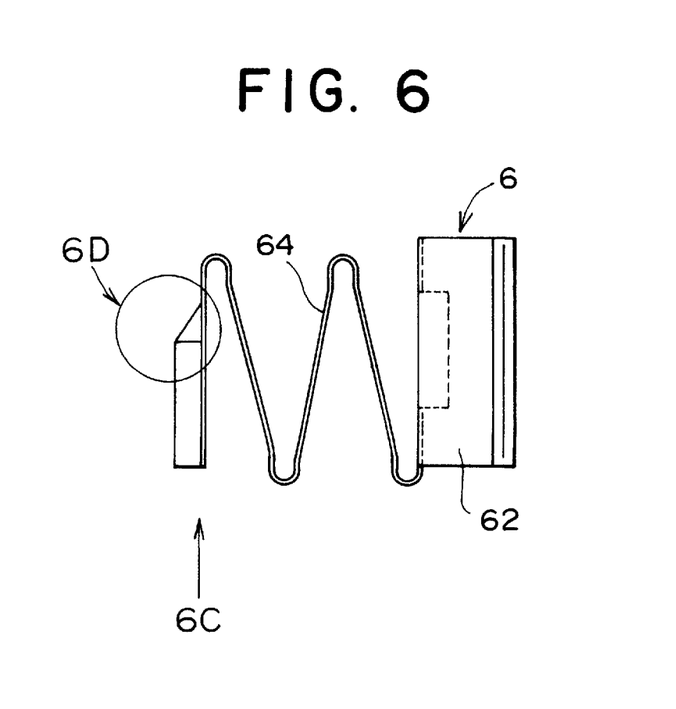
FIG. 6 is a plan view showing only the spring portion in the above embodiment.
Figure 7:
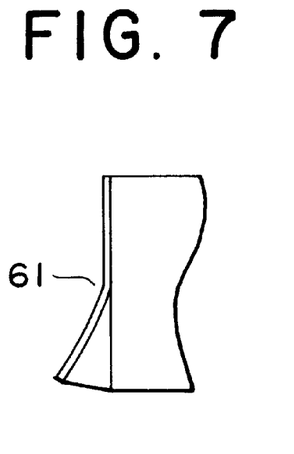
FIG. 7 is a view showing a part of a leaf spring shown in FIG. 6, from the direction indicated by the arrow 6C.
Figure 8:
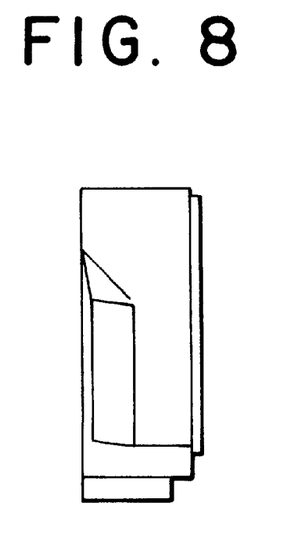
FIG. 8 is a view showing the leaf spring shown in FIG. 6, from the direction indicated by the arrow 6D.

A connection portion 65 of the base 62 of the leaf spring to a wave-formed or accordion-formed leaf spring main portion 64 is partially cut away and is folded back at the central portion in the axial direction thereof to form a tongue portion 66 which is a thrust portion thrust by the first protruding portion 43a. The degree and the direction of a biasing force to the torque transmitting member 6 can be finely adjusted, depending on the support of the clip-shaped portion 63 and a degree of the thrust of the tongue portion 66.

As described above, the two radially protruding portions 43a, 43b for supporting the leaf spring base are formed to be inclined, so that shape of the molding die thereof can be simplified and the retainer 4 can be molded easily. That is, the die can be removed slantingly, and the recess 43c for retaining the roller can be formed by the tip end of the molding die without removing forcibly.

Next, a manner of assembling of the outer race-retaining assembling will be described particularly.

Figure 9A:
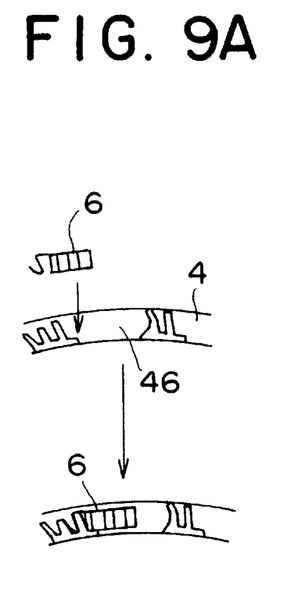
FIGS. 9A–9C include explanatory views showing states in which in FIG. 9A a leaf spring, in FIG. 9B a roller member and in FIG. 9C a block bearing are respectively assembled with the retainer.
Figure 9B:
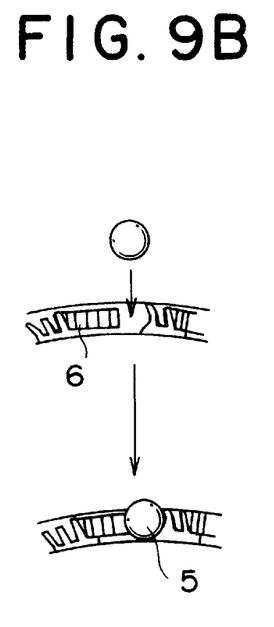

First, the leaf springs 6 and the torque transmitting members 5 are assembled with the retainer 4 which is integrally formed of plastic by injection molding, so as to form a retainer-transmitting member assembly 2.

Figure 10:
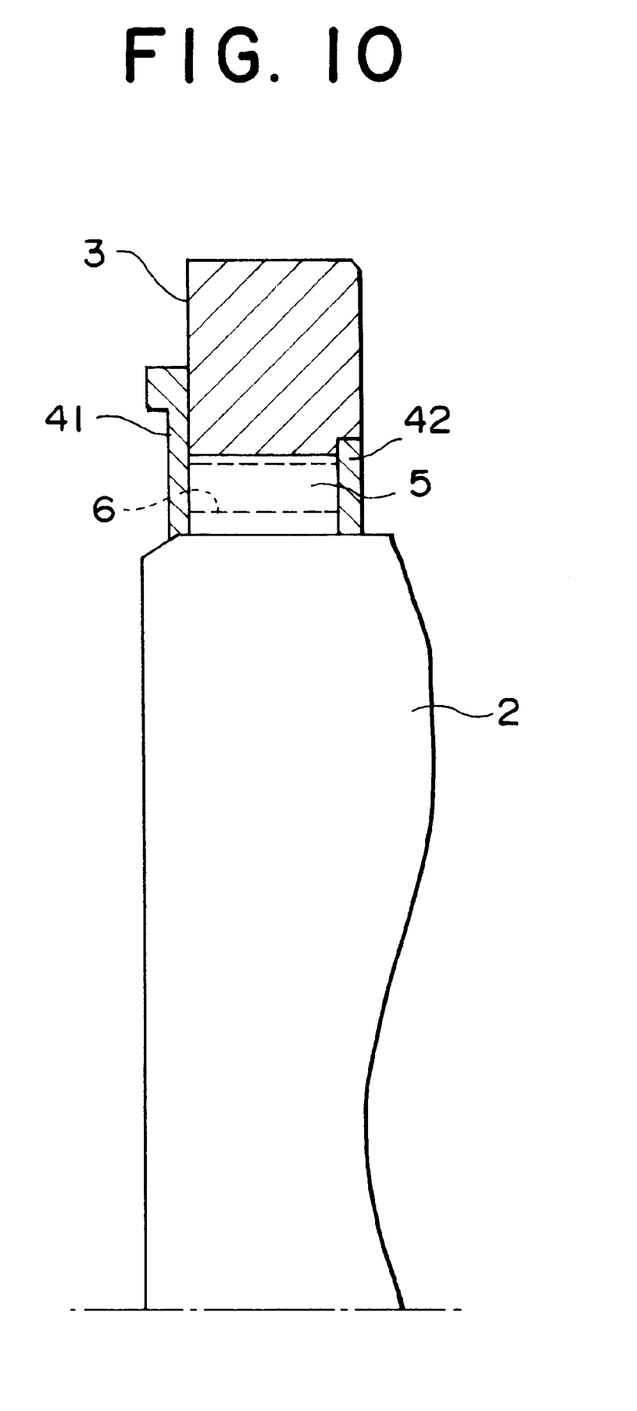
FIG. 10 is an explanatory view showing an assembled state of a oneway clutch according to the present invention.

Next, the retainer-transmitting member assembly is inserted laterally into the outer race 3. For this insertion, the radially protruding portions 44 of the retainer 4 are made corresponding to the grooves 31 on the inner peripheral side of the outer race 3. Since it is arranged that the torque transmitting members 6 come to the respective cam surfaces 32 of the outer race in a state that the radially protruding portions 44 of the retainer 4 are fitted in the corresponding grooves 31 of the outer race 3, it is easy to assemble the retainer-transmitting member assembly with the outer race. When the retainer 4 is rotated with respect to the outer race 3 only by a predetermined angle after the insertion, the radially protruding portions 44 of the retainer 4 face to be engaged with the stepped portion 33 of the outer race 3, so that the retainer-torque transmitting member assembly is positioned in the axial direction with respect to the outer race 3. Also, since the radially protruding portions 44 of the retainer are inside the stepped portion 33, the side face of the outer race and that of the retainer are on the same plane.

Figure 9C:
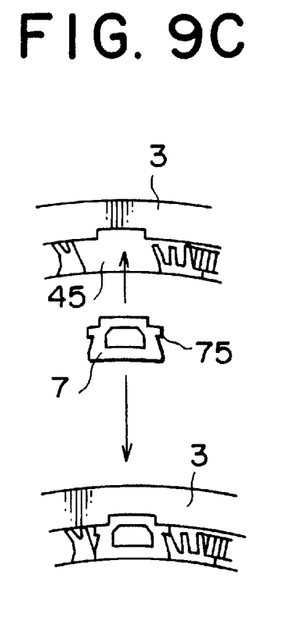

Since in this case the retainer 4 and the outer race 3 are in a predetermined positional relation, the block bearings 7 are then inserted from the inner diameter side of the retainer 4 through the first apertures 45, and the head 71 of each block bearing is fitted in the corresponding groove 31 of the outer race 3, as described above, so as to position and fix the retainer 4 in the circumferential direction.

Figure 1:
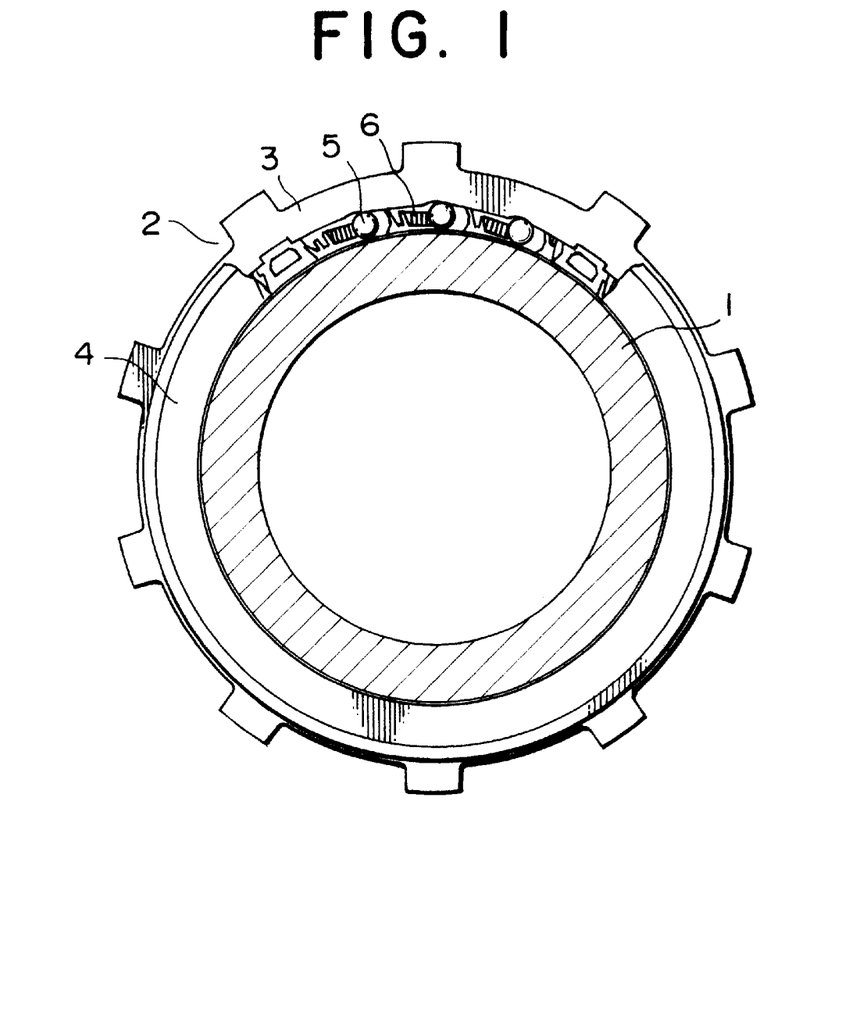
FIG. 1 is a front view showing a oneway clutch, partially cut-away, according to a preferred embodiment of the present invention.

Thus, the formation of the outer race-retainer assembly 2 is completed, and assembling of an inner member 1 with the outer race-retainer assembly 2 completes a oneway clutch.

According to the present invention, since the retainer is integrally made of plastic, no caulking portion is provided, unlike in a conventional structure in which the retainer is comprised of two metallic plates. As a result, there arises no problem of a damage to a caulking portion, and it is possible to provide a retainer and, in its turn, a oneway clutch, with stable strength and long service life.

Also according to the present invention, since the retainer is integrally made of plastic, it is possible to manufacture a retainer suitable for mass production with a reduced number of manufacturing steps at a lower cost.

Also according to the present invention, since the retainer is made of plastic, an aperture for inserting the block bearing in the retainer can be arranged to be slightly tight and the block bearing can be inserted and fitted into the aperture easily because of the elasticity of the retainer. Moreover, since the block bearing is fitted in the aperture without play, it is possible to position the retainer with respect to the outer race in the circumferential direction without play or backlash.

Also according to the present invention, since the retainer is made of plastic and has a self lubricating characteristic intrinsic to plastic, it is possible to provide a retainer having a strong resistance against abrasion of the torque transmitting member.

What is claimed is:

1. A oneway clutch comprising:

an inner member;

an outer race concentric with said inner member;

a number of torque transmitting members each provided between said inner member and said outer race to be displaced between a torque transmitting position and a non torque transmitting position;

a number of biasing members biasing corresponding torque transmitting members toward said torque transmitting position; and a retainer retaining said torque transmitting members and said biasing members;

wherein grooves extended in an axial direction are formed at predetermined positions on an inner peripheral side of said outer race, respective block bearings are fitted in said grooves through apertures provided on said retainer correspondingly to said grooves in order to position said retainer in a circumferential direction;

said retainer is integrally made of plastic and comprises a first annular side member having a larger diameter than that of a basic circle, said basic circle having its diameter defined by the inner peripheral side of said outer race, a second annular side member having a diameter smaller than, but substantially equal to, that of said basic circle of the outer race, and a plurality of pole portions connecting said first annular side member and said second annular side member in an axial direction;

said pole portions, together with said first and second annular side members, define said apertures for mounting said block bearings correspondingly to said grooves of said outer race;

radially protruding portions are formed on the second annular side member correspondingly to the grooves of the outer race;

an outer diameter of said radially protruding portions is smaller than that of bottoms of said grooves, which are surfaces, of said grooves having a larger diameter than said basic circle; and said oneway clutch is adapted to be assembled as follows:

inserting said retainer into said outer race from the side of said second annular side member in such a manner that said radially protruding portions are passed through said grooves of said outer race, after assembling said torque transmitting members and said biasing members with said retainer;

placing said radially protruding portions to face a side of said outer race, upon completion of the insertion, by rotating said retainer; and fitting said block bearings in said grooves of said outer race through said apertures from the inner peripheral side of the retainer.

2. A oneway clutch according to claim 1, wherein an annular stepped portion having a diameter larger than that of said radially protruding portions of said retainer is formed on an inner diameter of said side of said outer race facing said second annular side member of said retainer, so as to position the radially protruding portions of said retainer inside said annular stepped portion.

3. A oneway clutch according to claim 1, wherein said retainer defines second apertures, each for retaining a said torque transmitting member and a said biasing member, by said first and second annular side members and said pole portions.

4. An outer race-retainer assembly for a oneway clutch comprising:

an outer race to be provided concentrically with an inner member;

a number of torque transmitting members which, when disposed between said inner member and said outer race, can take a non torque transmitting position for allowing a relative rotation between said inner member and said outer race or a torque transmitting position for integrally rotating said inner member and said outer race;

a number of biasing members to bias respective torque transmitting members toward said torque transmitting position;

a retainer retaining said torque transmitting members and said biasing members; and a block bearing fixing said retainer to said outer race;

wherein a groove extended in an axial direction is provided at a predetermined position on an inner peripheral side of the outer race, and said block bearing is fitted in said groove through an aperture formed on said retainer correspondingly to said groove;

said retainer is integrally made of plastic and comprises a first annular side member having a larger diameter than that of a basic circle, said basic circle having its diameter defined by the inner peripheral side of said outer race, a second annular side member having a diameter smaller than, but substantially equal to, that of the basic circle of the outer race, and a plurality of pole portions connecting said first annular side member and said second annular side member in an axial direction;

said pole portions, together with said first and second annular side members, define said aperture for mounting said block bearing correspondingly to said groove of said outer race;

a radially protruding portion is formed on said second annular side member correspondingly to said groove of said outer race;

an outer diametral dimension at said radially protruding portion is smaller than that of a bottom of said groove which is a surface of said groove having a larger diameter than said basic circle; and said outer race-retainer assembly is adapted to be assembled as follows:

inserting said retainer into said outer race from the side of said second annular side member in such a manner that said radially protruding portion is passed through said groove of said outer race, after assembling said torque transmitting members and said biasing members with said retainer;

placing said radially protruding portion to face a side of said outer race, upon completion of the insertion, by rotating said retainer; and fitting said block bearing in said groove of said outer race through said aperture from the inner peripheral side of the retainer.

5. An outer race-retainer assembly for a oneway clutch according to claim 4, wherein an annular stepped portion having a diameter larger than the diametral dimension at said radially protruding portion of said retainer is formed on an inner diameter of said side of said outer race facing said second annular side member of said retainer, so as to position the radially protruding portion of said retainer inside said annular stepped portion.

6. An outer race-retainer assembly for a oneway clutch according to claim 4, wherein said retainer defines a plurality of second apertures, each for retaining a said torque transmitting member and a said biasing member, by said first and second annular side members and said pole portions.

7. A oneway clutch comprising:
an inner member;
an outer race concentric with said inner member;
a number of torque transmitting members each provided between said inner member and said outer race to be displaced between a torque transmitting position and a non torque transmitting position;
a number of biasing members biasing corresponding torque transmitting members toward said torque transmitting position; and
a retainer retaining said torque transmitting members and said biasing members;
wherein a groove extended in an axial direction is formed at a predetermined position on an inner peripheral side of said outer race, a block bearing is fitted in said groove through an aperture provided on said retainer correspondingly to said groove in order to position said retainer in a circumferential direction;
said retainer is integrally made of plastic and comprises a first annular side member having a larger diameter than that of a basic circle, said basic circle having its diameter defined by the inner peripheral side of said outer race, a second annular side member having a diameter smaller than, but substantially equal to, that of said basic circle of the outer race, and a plurality of pole portions connecting said first annular side member and said second annular side member in an axial direction;
said pole portions, together with said first and second annular side members, define said aperture for mounting said block bearing correspondingly to said groove of said outer race;
a radially protruding portion is formed on said second annular side member correspondingly to said groove of said outer race;
an outer diametral dimension at said radially protruding portion is smaller than that of a bottom of said groove, which is a surface of said groove having a larger diameter than said basic circle; and
said oneway clutch is adapted to be assembled as follows:
inserting said retainer into said outer race from the side of said second annular side member in such a manner that said radially protruding portion is passed through said groove of said outer race, after assembling said torque transmitting members and said biasing members with said retainer;
placing said radially protruding portion to face a side of said outer race, upon completion of the insertion, by rotating said retainer; and fitting said block bearing in said groove of said outer race through said aperture from the inner peripheral side of the retainer.

8. A oneway clutch according to claim 7, wherein an annular stepped portion having a diameter larger than that of said radially protruding portion of said retainer is formed on an inner diameter of said side of said outer race facing said second annular side member of said retainer, so as to position the radially protruding portion of said retainer inside said annular stepped portion.

9. A oneway clutch according to claim 7, wherein said retainer defines a plurality of second apertures, each for retaining a said torque transmitting member and a said biasing member, by said first and second annular side members and said pole portions.

10. An outer race-retainer assembly for a oneway clutch comprising:
an outer race to be provided concentrically with an inner member;
a number of torque transmitting members which, when disposed between said inner member and said outer race, can take a non torque transmitting position for allowing a relative rotation between said inner member and said outer race or a torque transmitting position for integrally rotating said inner member and said outer race;
a number of biasing members to bias respective torque transmitting members toward said torque transmitting position;
a retainer retaining said torque transmitting members and said biasing members; and
block bearings fixing said retainer to said outer race;
wherein grooves extended in an axial direction are provided at predetermined positions on an inner peripheral side of the outer race, and said block bearings are fitted in said grooves through apertures formed on said retainer correspondingly to said grooves;
said retainer is integrally made of plastic and comprises a first annular side member having a larger diameter than that of a basic circle, said basic circle having its diameter defined by the inner peripheral side of said outer race, a second annular side member having a diameter smaller than, but substantially equal to, that of the basic circle of the outer race, and a plurality of pole portions connecting said first annular side member and said second annular side member in an axial direction;
said pole portions, together with said first and second annular side members, define said apertures for mounting said block bearings correspondingly to said grooves of said outer race;
radially protruding portions are formed on said second annular side member correspondingly to said grooves of said outer race;
an outer diameter of said radially protruding portions is smaller than that of bottoms of said grooves, which are surfaces of said grooves having a larger diameter than said basic circle; and
said outer race-retainer assembly is adapted to be assembled as follows:
inserting said retainer into said outer race from the side of said second annular side member in such a manner that said radially protruding portions are passed through said grooves of said outer race, after assembling said torque transmitting members and said biasing members with said retainer;

placing said radially protruding portions to face a side of said outer race, upon completion of the insertion, by rotating said retainer; and fitting said block bearings in said grooves of said outer race through said apertures from the inner peripheral side of the retainer.

11. An outer race-retainer assembly for a oneway clutch according to claim 10, wherein an annular stepped portion have a diameter larger than that of said radially protruding portions of said retainer is formed on an inner diameter of said side of said outer race facing said second annular side member of said retainer, so as to position the radially protruding portions of said retainer inside said annular stepped portion.

12. An outer race-retainer assembly for a oneway clutch according to claim 10, wherein said retainer defines a plurality of second apertures, each for retaining a said torque transmitting member and a said biasing member, by said first and second annular side members and said pole portions.

* * * * *